(12) United States Patent
Tuan

(10) Patent No.: US 7,967,105 B2
(45) Date of Patent: Jun. 28, 2011

(54) AERO-ACOUSTIC AVIATION ENGINE INLET FOR AGGRESSIVE NOISE ABATEMENT

(76) Inventor: Yen Tuan, Kirkland, WA (US)

( * ) Notice: Subject to any disclaimer, the term of this patent is extended or adjusted under 35 U.S.C. 154(b) by 307 days.

(21) Appl. No.: 11/455,301

(22) Filed: Jun. 19, 2006

(65) Prior Publication Data

US 2010/0243370 A1    Sep. 30, 2010

(51) Int. Cl.
*B64D 33/02* (2006.01)
(52) U.S. Cl. .......... 181/214; 181/210; 244/1 N; 415/119
(58) Field of Classification Search .............. 181/210, 181/214, 290, 292, 213, 222; 415/119; 244/53 B, 244/1 N
See application file for complete search history.

(56) References Cited

U.S. PATENT DOCUMENTS

| | | | | |
|---|---|---|---|---|
| 2,948,148 A * | 8/1960 | Bertin et al. | ............. | 73/147 |
| 3,446,223 A * | 5/1969 | Hancock | ............. | 137/15.2 |
| 3,533,486 A * | 10/1970 | Paulson | ............. | 181/214 |
| 3,664,612 A * | 5/1972 | Skidmore | ............. | 244/53 B |
| 3,820,628 A * | 6/1974 | Hanson | ............. | 181/214 |
| 4,291,080 A * | 9/1981 | Ely et al. | ............. | 428/116 |
| 4,416,349 A * | 11/1983 | Jacobs | ............. | 181/208 |
| 4,749,150 A * | 6/1988 | Rose et al. | ............. | 244/53 B |
| 4,909,346 A * | 3/1990 | Torkelson | ............. | 181/213 |
| 4,989,807 A * | 2/1991 | Foreman et al. | ............. | 244/53 B |
| 5,447,283 A * | 9/1995 | Tindell | ............. | 244/207 |
| 5,707,206 A * | 1/1998 | Goto et al. | ............. | 415/173.1 |
| 5,721,402 A * | 2/1998 | Parente | ............. | 181/214 |
| 6,206,136 B1 * | 3/2001 | Swindlehurst et al. | ............. | 181/290 |
| 6,244,817 B1 * | 6/2001 | Ngo | ............. | 415/119 |
| 6,379,110 B1 * | 4/2002 | McCormick et al. | ............. | 415/119 |
| 6,409,469 B1 * | 6/2002 | Tse | ............. | 415/119 |
| 6,772,857 B2 * | 8/2004 | Porte et al. | ............. | 181/210 |
| 7,047,725 B2 * | 5/2006 | Moe et al. | ............. | 60/262 |
| 7,055,308 B2 * | 6/2006 | Pinard et al. | ............. | 60/247 |
| 2002/0125067 A1 * | 9/2002 | Porte et al. | ............. | 181/210 |
| 2004/0045766 A1 * | 3/2004 | Porte et al. | ............. | 181/210 |
| 2004/0065502 A1 * | 4/2004 | Yamamoto | ............. | 181/214 |
| 2005/0060982 A1 * | 3/2005 | Mani et al. | ............. | 60/226.1 |
| 2005/0284690 A1 * | 12/2005 | Proscia et al. | ............. | 181/214 |
| 2006/0219475 A1 * | 10/2006 | Olsen et al. | ............. | 181/214 |
| 2007/0034447 A1 * | 2/2007 | Proscia et al. | ............. | 181/290 |
| 2007/0102234 A1 * | 5/2007 | Prasad et al. | ............. | 181/214 |

OTHER PUBLICATIONS

Bradshaw, P. et al., "Turbulent Wall Jets with and without an External Stream", Ministry of Aviation, Aeronautical Research Council Reports and Memoranda, R. &M. No. 3252, Jun. 1960, 51 pages.
Gartshore, "The Streamwise Development of Two-Dimensional Wall Jets and Other Two-Dimensional Turbulent Shear Flows", Department of Mechanical Engineering, McGill University, Montreal, P.Q., Aug. 1965, 205 pages.
McGahan, "The Incompressible, Turbulent Wall Jet in an Adverse Pressure Gradient", Gas Turbine Laboratory, Massachusetts Institute of Technology, Sep. 1965, 134 pages.
Peake, D.J., "The Use of Air Injection to prevent Separation of the Turbulent Boundary Layer in Supersonic Flow", Ministry of Aviation, Aeronautical Research Council Current Papers, C.P. No. 890, 1966, 50 pages.

(Continued)

*Primary Examiner* — Jeremy Luks

(57) ABSTRACT

An aero-acoustic aviation engine inlet with a single air blowing slot or multiple air blowing slots flows air over one or more segments of inlet acoustic lining surfaces at speeds that are higher than the inlet mean air flow speed, for aggressive inlet noise abatement.

11 Claims, 4 Drawing Sheets

OTHER PUBLICATIONS

Whitelaw, James H., "An Experimental Investigation of the Two-dimensional Wall Jet", Ministry of Technology, Aeronautical Research Council Current Papers, C.P. No. 942, 1967, 52 pages.

McAlpine, A. et al., " "Buzz-saw" noise in acoustically lined ducts: comparison of measurement with prediction", Institute of Sound and Vibration Research, University of Southampton; AIAA 2002-2448, Copyright 2002 by the American Institute of Aeronautics and Astronautics, Inc., pp. 569-579.

Wilkinson, M.J. et al., "Active Control of Buzz-saw Tones: Experimental Results from a Laboratory-scale Rig", Institute of Sound and Vibration Research, University of Southampton; 11th AIAA/CEAS Aeroacoustics Conference (26th AIAA Aeroacoustics Conference) May 23-25, 2005. AIAA 2005-3074, Copyright 2005 by Phillip Joseph. Published by the American Institute of Aeronautics and Astronautics, Inc., pp. 1-16.

\* cited by examiner

AERO-ACOUSTIC AVIATION ENGINE INLET FOR AGGRESSIVE NOISE ABATEMENT

BACKGROUND

1. Technical Field

Embodiments of the present disclosure are related in general to the management of aircraft engine noise, and in particular, to the management of noise emanating from the inlet of a turbo-fan engine.

2. Description of the Related Art

Jet airplanes are configured such that the propulsion systems, called nacelles, are attached to the airframe either on or near the wings or near the rear fuselage. Among the components of each nacelle is a turbo-fan engine. The front interface of the turbo-fan engine is in contact with an air intake system, called the inlet.

A conventional inlet consists of three segments of surfaces, namely, a contoured interior surface, an inlet lip surface, and a contoured exterior surface. The inlet lip surface and the exterior surface are integral parts of the front portion of the nacelle cowling.

In the 1970's, a flight hardware acoustic nacelle demonstration program was designed, and tests carried out to evaluate what could be done about reducing engine noise. In that program, noise absorption lining materials were installed onto the interior surfaces of the inlet and fan exhaust. It was found that fan exhaust noise could be managed.

However, it was also found that inlet noise was not greatly affected by inlet peripheral linings (inlet acoustic rings were not desirable). The situation was aggravated by the restriction on the flight inlet length—simply put, there was not enough surface area for the needed linings, as compared to that available in the fan exhaust duct.

In addition, buzz saw noise generated in the fan inlet that was a type of noise not generated at the fan exhaust duct. Identification of buzz saw noise signatures and methods of their attenuation were pursued in the 1970's and are continuing up to the present. Buzz saw noise is a dominant inlet noise component at take-off engine speeds. During take-off and climb out operations, the engine fan is operating at a near maximum speed to satisfy the thrust demands. A large portion of the fan blades is operating at supersonic speeds. An uneven circumferentially locked fan rotor shock system generates buzz saw tones at multiple rotor rotational frequencies. To reduce these buzz saw tones, acoustic linings were observed as being more effective, compared to their effectiveness with other inlet noise signatures. However, the effectiveness of acoustic linings at attenuating buzz saw noise was still limited.

It was also found that boundary layer flow development in the inlet degrades the noise reduction performance of inlet acoustic lining.

It would seem logical to apply suction to the Inlet boundary layer flow to remove the boundary layer in order to restore noise reduction performance of the inlet lining to that at laboratory test condition. But from the point of view of inlet noise abatement as a whole, the effect of boundary layer flow suction is limited. The benefit vs. cost balance does not favor the application of boundary layer flow suction. The struggle in dealing with inlet noise and its reduction is an on-going task up to the present.

DETAILED DESCRIPTION

Figure 1:
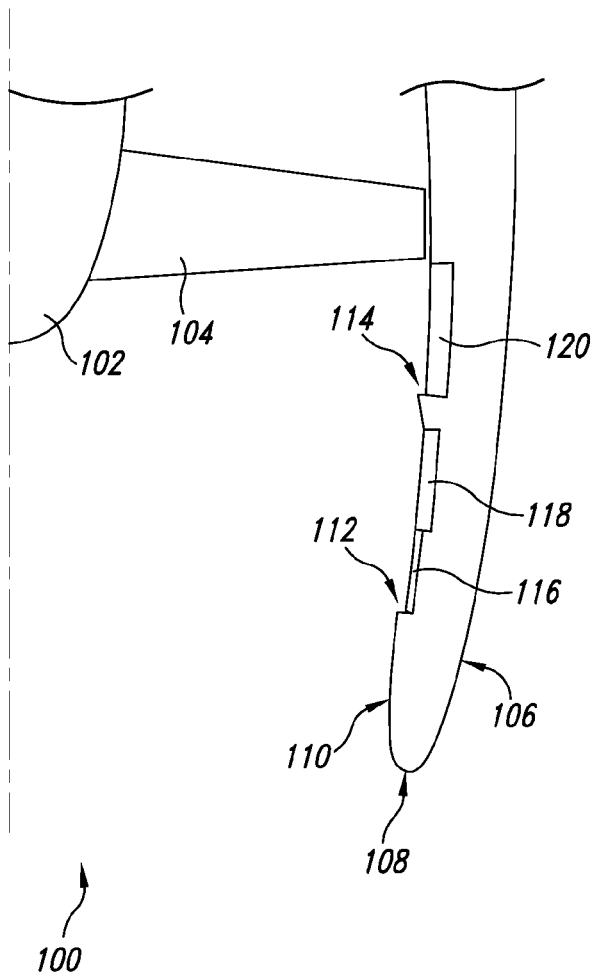
FIG. 1 shows a cross-sectional view of a representative aero-acoustic inlet, according to one embodiment.

The FIG. 1 shows a portion of an aero-acoustic inlet 100 in relation to a center body 102 and leading fan blade 104 of a turbo-fan engine. The inlet 100 is substantially cylindrical in shape, and includes an outer surface 106, a lip surface 108, and an interior surface 110. The lip surface 108 and the exterior surface 106 are the front components of the airplane propulsion system cowling, which is designed to minimize drag caused by the inlet 100.

As shown in the illustrated embodiment, the interior surface 110 comprises first and second blowing slots 112, 114, and first, second, and third acoustic lining segments 116, 118, 120. The first blowing slot 112 is shown in the shape of a downstream facing step. It is annular, extending around the circumference of the interior surface 110 of the aero-acoustic inlet 100. Air exits the first slot 112 and flows over the inlet interior surface. The first and second acoustic lining segments 116, 118 lie immediately behind, or downstream from a lip of the first blowing slot 112.

The combination of the second blowing slot 114 and the third acoustic lining 120 is configured substantially as that of the first blowing slot 112 and the first and second acoustic lining segments 116, 118, i.e., the second blowing slot 114, shown in the shape of a downstream facing step, is annular, and the third acoustic lining 120 is positioned immediately downstream from the second blowing slot 114.

In operation, the blowing air exits from each of the blowing slots 112, 114 and grazes along the surface of the respective acoustic lining 116, 118, 120, thus creating a new thin boundary layer there. The air flow in the neighborhood of the lining surface is at a higher speed than that of the inlet mean flow. This new flow field near the lining surface creates an inverted boundary layer profile, and increases the attenuation performance of the first, second, and third acoustic linings 116, 118, 120.

The inventor surmised that an inverted boundary layer profile created by blowing an air flow over the acoustic lining surface of an inlet might improve noise attenuation as compared to applying boundary layer suction. Laboratory tests were designed and carried out. The test configurations included blowing an air flow as well as creating a thick boundary layer by a downstream facing step. The test results showed an unexpectedly great improvement of attenuation by the lining, as compared to the prior art. For example, the degree of attenuation of buzz saw noise was doubled. Additionally, the improved noise attenuation was directly perceptible in audio recordings of the tests.

An air flow over the lining surface as described above has been experimentally demonstrated to provide a marked enhancement of the attenuation performance of the lining, effectively doubling the attenuation magnitudes. This marked enhancement in buzz saw noise attenuation is one advantage of the aero-acoustic inlet.

Random inlet broadband noise spans wide frequency ranges for all engine speeds. Fan tip clearance, tip vortices, and tip boundary layer flow are the culprits. "Cleaning out" the fan tip flow by blowing an air flow reduces the broadband noise generation.

In addition, blowing air over the lining surfaces has been demonstrated to enhance broadband noise attenuation of the acoustic lining as compared to the prior art. The twin effects of cleaning out the fan tip flow and enhancing the performance of the acoustic lining reduce the inlet broadband noise, and are unique features of the aero-acoustic inlet.

During approach and landing operations, discrete tones at multiple fan blade passing frequencies are generated. Past practice has been to use linings for attenuation. Blowing air over the lining surface at speeds that are higher than the mean flow speed of the inlet to remove the boundary layer and to create an inverted flow profile therein, enhances the attenuation performance of the lining.

While the blowing slots 112, 114 described with reference to the drawing are shown and described as being in the shape of downstream facing steps, according to other embodiments, they are flush with the contour of the interior surface of the inlet. The temperature of the air flow from the blowing slots can be different from that of the inlet mean flow. Additionally, control of air flow of the blowing slots can be in an on-off mode or any other adaptive mode.

While shown and described as including three acoustic lining segments, the aero-acoustic inlet includes at least one acoustic lining segment, but can include any number of segments. Preferably, one segment is optimized at a frequency below blade passing frequency (BPF), a second lining segment is optimized at a frequency near BPF, and a third is optimized at a frequency above BPF. Effective attenuation frequency bandwidth of the acoustic lining segments is among the optimization considerations.

An aero-acoustic inlet can be employed with engines of jet airplanes of all take-off gross weights, and enhances attenuation of the turbo-fan engine inlet noise over the attenuation that can be achieved with acoustic linings alone. The improvement of inlet noise attenuation applies to all inlet noise components, including buzz saw noise, broadband noise, and tone noise at fan blade passing frequency. Therefore inlet noise attenuation is improved under all airplane operation conditions, including take-off, climb out, approach, landing, and taxiing.

Figure 2:
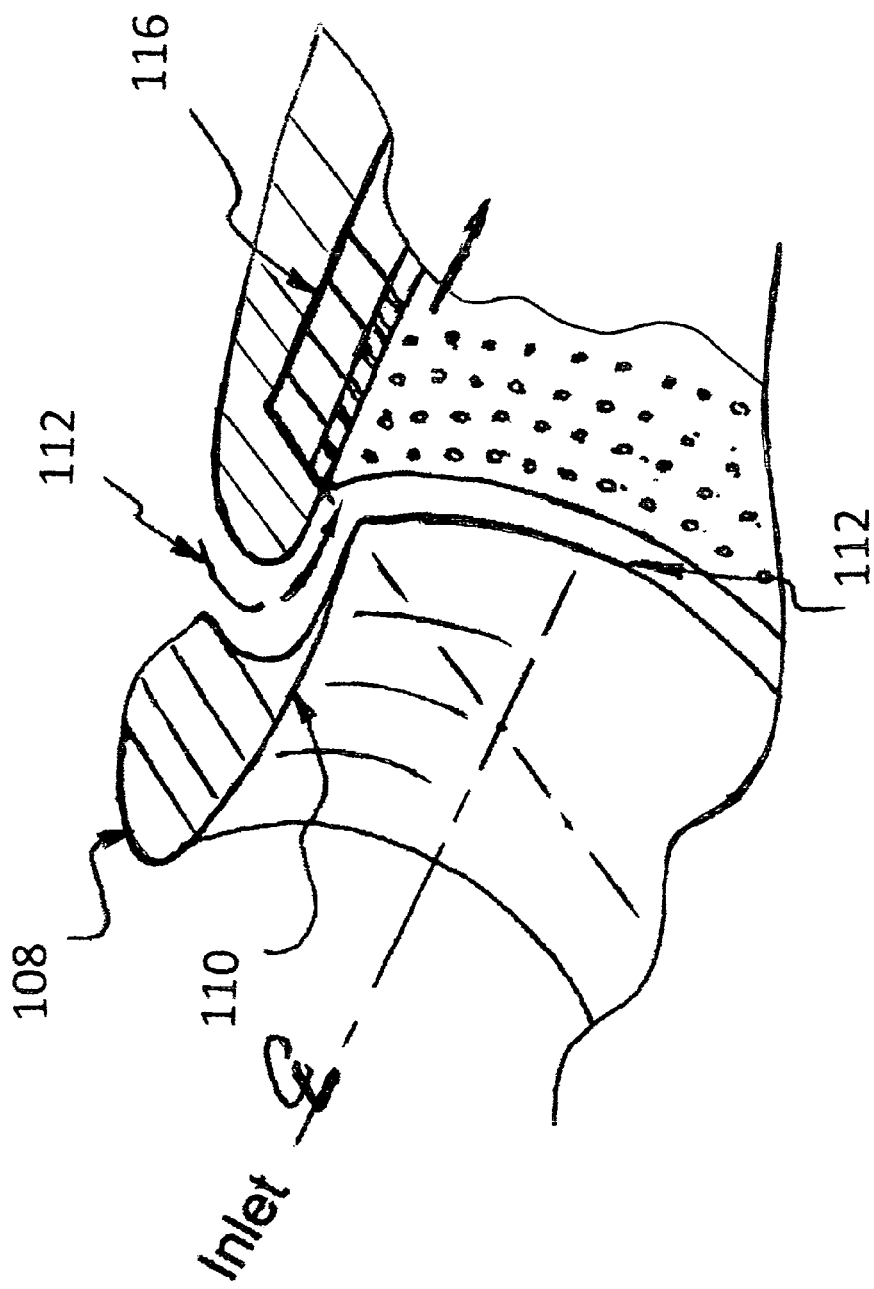
FIG. 2 shows a prospective view of the frontal portion of the inlet in FIG. 1.
Figure 3:
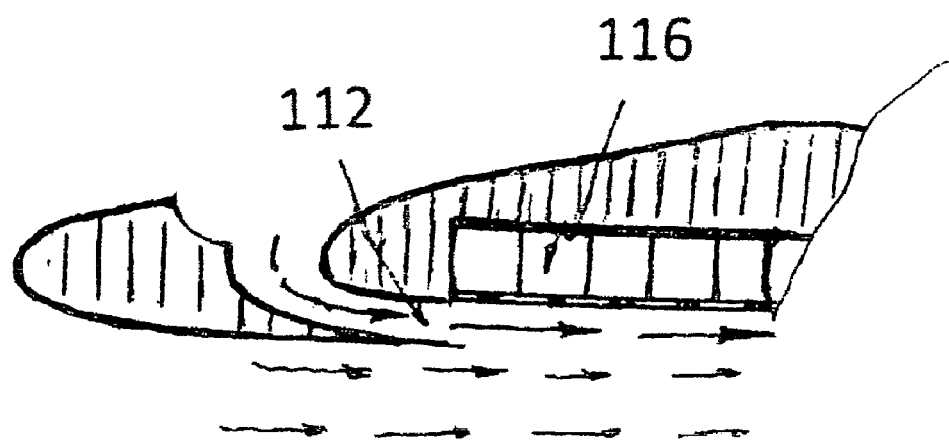
FIG. 3a and FIG. 3b show the respective annular blowing slot lips.
Figure 3:
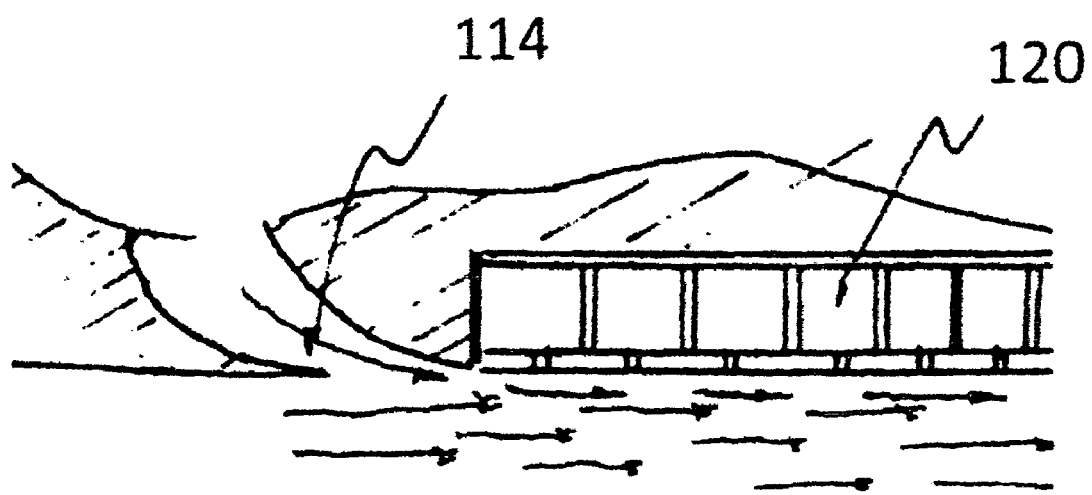

In FIG. 2 is shown an annular blowing slot, 112. The slot extends axial-symmetrically 360 degrees in the circumferential direction all the way around the inlet axis. FIG. 2 also shows what it means by the annular blowing slot positioned immediately upstream from the position of the acoustic lining segment 116. Inlet lip surface 108 and inlet interior surface 110 are also shown in FIG. 2. FIG. 3a shows an annular blowing slot 112 having a slot lip in the shape of a downstream facing step. Also shown in FIG. 3a is an acoustic lining segment 116. FIG. 3b shows an annular blowing slot 114 having a slot lip flush with the inlet interior surface. Also shown in FIG. 3b is an acoustic lining segment 120.

I claim:

1. An inlet for an aviation engine, comprising: a lip surface of the inlet; an interior surface of the inlet extending inward from the lip surface inside the inlet; a first acoustic lining segment positioned downstream from the lip surface and a second acoustic lining segment positioned downstream from the first acoustic lining segment, each of the first and second lining segments having an exposed surface defining a portion of the interior surface of the inlet; a first annular blowing slot positioned immediately upstream from the first acoustic lining segment, extending circumferentially around the interior surface and configured to blow a first flow of air along the interior surface of the inlet such that the first flow of air flows over the first and second acoustic lining segments; and a third acoustic lining segment positioned downstream from the second acoustic lining segment and having an exposed surface defining a portion of the interior surface of the inlet; and a second annular blowing slot positioned immediately upstream from the third acoustic lining segment and configured to blow a second flow of air along the interior surface of the inlet such that the second flow of air flows over the third acoustic lining segment; each of the first, second, and third acoustic lining segments being optimized for a respective noise frequency that is different from the each of the other acoustic lining segments.

2. The inlet of claim 1, wherein the first blowing slot has a lip in the shape of a downstream facing step.

3. The inlet of claim 1, wherein the first blowing slot is flush with the interior surface of the inlet.

4. The inlet of claim 1, wherein the first blowing slot is upstream from a position of a leading fan blade of the engine.

5. The inlet of claim 1, wherein the first acoustic segment is optimized at a frequency below a blade passing frequency (BPF), the second lining segment is optimized at a frequency near the BPF, and the third is optimized at a frequency above the BPF.

6. A method for attenuating noise in an aviation engine, comprising:

generating noise in an inlet of an aviation engine; attenuating the noise using first and second acoustic lining segments positioned in the inlet upstream from a fan of the aviation engine; and improving the noise attenuation of the first and second acoustic lining segments by blowing a flow of air from a first annular blowing slot positioned immediately upstream from the first and second acoustic lining segments along a surface of the first and second acoustic lining segments at a speed that is greater than a mean flow speed of the inlet; and further attenuating the noise using a third acoustic lining segment positioned in the inlet downstream from a second acoustic lining segment; and improving the noise attenuation of the third acoustic lining segment by blowing a second flow of air from a second annular blowing slot positioned immediately upstream from the third acoustic lining segment along a surface of the third acoustic lining segment at a speed that is greater than a mean flow speed of the inlet; wherein each of the first, second, and third acoustic lining segments are optimized for a respective noise frequency that is different from the each of the other acoustic lining segments.

7. The inlet of claim 6, wherein the first acoustic segment is optimized at a frequency below a blade passing frequency (BPF), the second lining segment is optimized at a frequency near the BPF, and the third is optimized at a frequency above the BPF.

8. A noise abatement inlet for an aviation engine, comprising: a lip surface of the inlet; an interior surface of the inlet extending inward from the lip surface inside the inlet; a first acoustic lining segment positioned downstream from the lip surface having an exposed surface defining a portion of the interior surface of the inlet; a first annular blowing slot positioned immediately upstream from the first acoustic lining segment, extending circumferentially around the interior surface and configured to blow a first flow of air along the interior surface of the inlet such that the first flow of air flows over the first acoustic lining segment; wherein in the first annular blowing slot and the first acoustic lining segment, whereby an improvement of the noise attenuation of the first acoustic lining segment and the reduction of fan rotor tip broad band noise source occurs, comprising the blowing of an axial-symmetric layer of air grazing over the entire length of the surface of the first acoustic lining segment, the blowing flow direction being axial, the speed of the blowing being subsonic and larger than the mean flow speed of the inlet, and wherein the blowing of the first flow of air being in adaptive control.

9. The inlet of claim 8, wherein the first blowing slot has a lip in the shape of a downstream facing step.

10. The inlet of claim 8, wherein the first blowing slot is flush with the interior surface of the inlet.

11. The inlet of claim 8, wherein the first blowing slot is upstream from a position of a leading fan blade of the engine.

* * * * *